United States Patent
Bradley (10) Patent No.: US 9,949,059 B1
(45) Date of Patent: Apr. 17, 2018

(54) APPARATUS AND METHOD FOR DISABLING PORTABLE ELECTRONIC DEVICES

(71) Applicant: James Roy Bradley, Carp (CA)

(72) Inventor: James Roy Bradley, Carp (CA)

( * ) Notice: Subject to any disclaimer, the term of this patent is extended or adjusted under 35 U.S.C. 154(b) by 132 days.

(21) Appl. No.: 14/031,376

(22) Filed: Sep. 19, 2013

Related U.S. Application Data (60) Provisional application No. 61/702,814, filed on Sep. 19, 2012.

(51) Int. Cl.
*H04W 4/02* (2018.01)
*H04W 4/00* (2018.01)

(52) U.S. Cl.
CPC ............. *H04W 4/001* (2013.01); *H04W 4/02* (2013.01)

(58) Field of Classification Search
CPC ........... H04M 1/6075; H04M 1/72577; H04M 1/6058; H04M 1/72558; H04W 4/02; H04W 48/04
See application file for complete search history.

(56) References Cited

U.S. PATENT DOCUMENTS

| | | | |
|---|---|---|---|
| 6,256,558 B1 | 7/2001 | Sugiura et al. | |
| 6,950,525 B2 * | 9/2005 | Harrell et al. | ................... 381/59 |
| 7,729,204 B2 | 6/2010 | Peng et al. | |
| 8,275,145 B2 | 9/2012 | Buck et al. | |
| 8,379,874 B1 * | 2/2013 | Simon | .............................. 381/82 |
| 2008/0129475 A1 | 6/2008 | Breed et al. | |
| 2008/0268768 A1 | 10/2008 | Brown et al. | |
| 2008/0304361 A1 | 12/2008 | Peng et al. | |
| 2009/0029675 A1 | 1/2009 | Steinmetz | |
| 2009/0179789 A1 | 7/2009 | Haughay et al. | |
| 2009/0267823 A1 | 10/2009 | Steinmetz et al. | |
| 2010/0233959 A1 | 9/2010 | Konishi et al. | |
| 2011/0021234 A1 | 1/2011 | Kelly et al. | |
| 2011/0065375 A1 * | 3/2011 | Bradley | ........................... 455/1 |
| 2011/0117903 A1 | 5/2011 | Bradley | |
| 2011/0207448 A1 | 8/2011 | Chen et al. | |
| 2012/0148058 A1 | 6/2012 | Chen | |
| 2012/0303147 A1 * | 11/2012 | Shah | ..................... G10L 19/018 700/94 |
| 2013/0321208 A1 * | 12/2013 | Sathish | ................. G01S 5/0252 342/386 |

\* cited by examiner

*Primary Examiner* — Liton Miah
(74) *Attorney, Agent, or Firm* — Thomas L. Adams (57) ABSTRACT

A device includes a delay element that can produce from the demodulated output of a radio receiver, a delayed signal that is delayed by an adjustable amount. A processor is coupled to the delay element and to a correlation element. The correlation element can correlate an acoustic signal from a transducer with information from the delayed signal from the delay element. The processor can adjust the delay and detect from the correlation element one or more peak correlations. The delays dictated by the processor, that produce one or more peak correlations, are used to deduce a use of a portable electronic device proximal to an operator's station, and to operate a switching element for altering services at the portable electronic device.

18 Claims, 11 Drawing Sheets

PRIOR ART

*Fig. 9b*

APPARATUS AND METHOD FOR DISABLING PORTABLE ELECTRONIC DEVICES

BACKGROUND OF THE INVENTION

1. Field of the Invention

The present invention relates to portable electronic device service altering functions, cell phones service altering functions, pager service altering functions, service altering functions for watches equipped with electronic communications functions, service altering functions for glasses equipped with electronic communications functions, methods thereof, and particularly to the service inhibiting functions thereof.

2. Description of the Related Art

Although generally considered to be dangerous, and commonly outlawed, portable electronic use whilst driving continues in spite of the prevalence of laws prohibiting such use. This use is commonly phoning, texting, preparing for a text, or the running of applications. Portable electronic device use during transit by vehicle occupants is lucrative for the cell network carriers. Consequently determination to resolve this had received reduced attention from the public until the phenomenon of driver distraction and resultant accidents rose in priority.

As a result, the resolution of the distracted driving problem as might be alleviated or eliminated, through use of technology to permit alteration of portable electronic device services, such as phone inhibits, text setup inhibits, sending text in place of answering the phone, etc. have not been fully focused on that of the driver.

Many different mechanisms exist for reducing driver distraction from portable electronic devices, such as sensing velocities greater than x miles per hour (US patent applications US2007/0072616, and US2011/0028139), sensing a geographic change greater than x feet in y seconds, sensing a geographic area (US2008/0305808) sensing vehicular acceleration, a cell tower ID change, cell tower radial change, triangulation, GPS position, Key use (US patent application US2011/0093161) etc. The overly simplistic solution offered is to inhibit all users detected in such environments. Cell carrier adoption is limited as these solutions deny the cell network operator's legitimate business with vehicular passengers. Consequently commercial uptake is limited. Alternate solutions exploit GPS based Geo-fence applications preclude Cell use proximal to sensitive areas, schools, hospitals, etc where pedestrian traffic density is higher Still other solutions report text use, and optionally text use in conjunction with location. Unfortunately a certain demographic of the portable electronic device user base continue to use texting while driving, leading to distraction, and sometimes leading to death or dismemberment Other solutions include operator restriction via key use, or vehicular operation relayed via the On-Board Data Bus, (ODB and ODB-11) Unfortunately this requires a relatively high hardware investment on the part of the user, and constrains the vehicle owner to install such equipment in each vehicle to be used.

Ideally a solution requires minimal/no vehicular installation, and addresses the needs of the present fleet, which typically includes FM stereo radio receivers. FM is used for localization assistance through use of received signal strength indication (RSSI). Portable electronic devices are available with a modification that permits the downloading of content based on sensing it via the device's microphone. The potentially heavy computational work of identifying the content is optionally done remotely via attachment to a network, e.g. the Internet cloud.

RELATED REFERENCES

See also US Patent applications US2008/0129475, US2008/0268768, US2009/0029675, US2009/0267823, US20100233959, US2011/0021234, US20110117903, US2012/0148058, US2012/0148058, US2011/0207448, 61/556,501, and U.S. Pat. No. 8,275,145, U.S. Pat. No. 6,256,558, and U.S. Pat. No. 7,729,204

See also *WALRUS: Wireless Acoustic Location with Room-Level Resolution using Ultrasound*, Borriello et al. Mobisys 2005,

*Sneaker Position Estimation in Vehicles by Means of Acoustic Analysis*, Swerdlow, et al. DAGA 2008, Dresden Germany,

*FM-based Indoor Localization*, Chen et al. Mobisys 2012, Low Wood Bay, UK, and *The Design and Implementation of a Self-Calibrating Distributed Acoustic Sensing Platform*, Girod et al. SenSys 2006, ACM Boulder Colo., USA Other related references include:

Aegis, CarSafetyAssistant, CellBlocker, CellControl, CellTinel, DriveSafer, Illume Software, iZup, JustDrive, Key2SafeDriving, ODBEdge, PhoneGuard, TxtBlocker, TextZapper, ZoomSafer

SUMMARY OF THE INVENTION

A portable electronic device identifies its position with respect to channelized content sources and alters seNices for certain determined criteria. In one embodiment, the unit identifies from the acoustic source (microphone) and downloads the content Other embodiments exploit real time content from broadcast sources that correspond to the acoustic environment, e.g., to the radio channel being heard. In either case the comparisons are done in portable electronic device processor, using portable electronic device memory, powered by portable electronic device battery. Either as an on-going thread, or after a trigger indicative of vehicular use, the device deduces local with respect to acoustic sources, e.g., vehicular acoustic sources. In some embodiments this entails adjustment of seNices, such as portable electronic device inhibition, application adjustment, or execution.

Some record-and-playback embodiments determine the side of vehicle the device is used/intended-to-be-used and inhibits services accordingly. Some record-and-playback embodiments of device placement determination are done based on quadraphonic sound.

Some received RF embodiments determine not only side of vehicle, but also, fore/aft of vehicle and inhibit seNices, e.g., key press. Deductions of left/right are made based on relative time of arrival between the left and right channels. Deductions of fore/aft are made based on absolute time taken between received RF signal (presumed to be close enough in time to that of the local radio being sensed as to be of negligible time difference), and the incoming acoustic signal. Deductions of fore/aft and left/right are also made by relative time difference.

Portable electronic device arrangement can alter services, inhibit services, stop execution of application, replace answering a call with text, force a user to use voice recognition or signal via a network entity based on deduced location proximal to operator's station in moving vehicle. The adjunct device exploits acoustic content sensed at the portable electronic device users location, and preferentially diminishes the users ability to contribute to conversations proximal to the vehicle's operator's station. Based on an arrangement whereby the adjunct device compares/enables comparison of sensed content to known content to identify and facilitate access, via download, or database access, wherein the content is channelized. The adjunct exploits expected locations of the source of particular channel information, i.e. content expected from: left front speaker, right front speaker, left rear speaker, right rear speaker, in comparison to channelized content information accessed to deduce the user's transducer, e.g., microphone location, and can thereby alter services, i.e., shut off based on said deduction. Alternate arrangements provide for content comparison sensed by the portable electronic device transducer, e.g., microphone, and information indicative of channelized content received from the Radio Frequency RF domain, to make a deduction concerning which acoustic channel, and the acoustic delay from speaker to microphone, from this deduction, make a deduction as to which seat the user is occupying and to alter portable electronic characteristics based thereupon. E.g. to compare a received radio channel's left/right, front/rear and any combination thereof with relative position in time of any channel vestiges encoded to permit the deduction of if the portable electronic device is proximal to the operator's station and to thereby inhibit Optionally, commanding the on-board receiver to dwell on each of the acceptable channels for a given broadcast band, the unit attempts correlations with the received channel to determine which channel the vehicular receiver is tuned to.

BRIEF DESCRIPTION OF THE DRAWINGS

The above brief description as well as, other objects, features and advantages of the present invention will be more fully appreciated by reference to the following detailed description of illustrative embodiments in accordance with the present invention when taken in conjunction with the accompanying drawings, wherein.

DETAILED DESCRIPTION OF THE EMBODIMENTS

Figure 1:
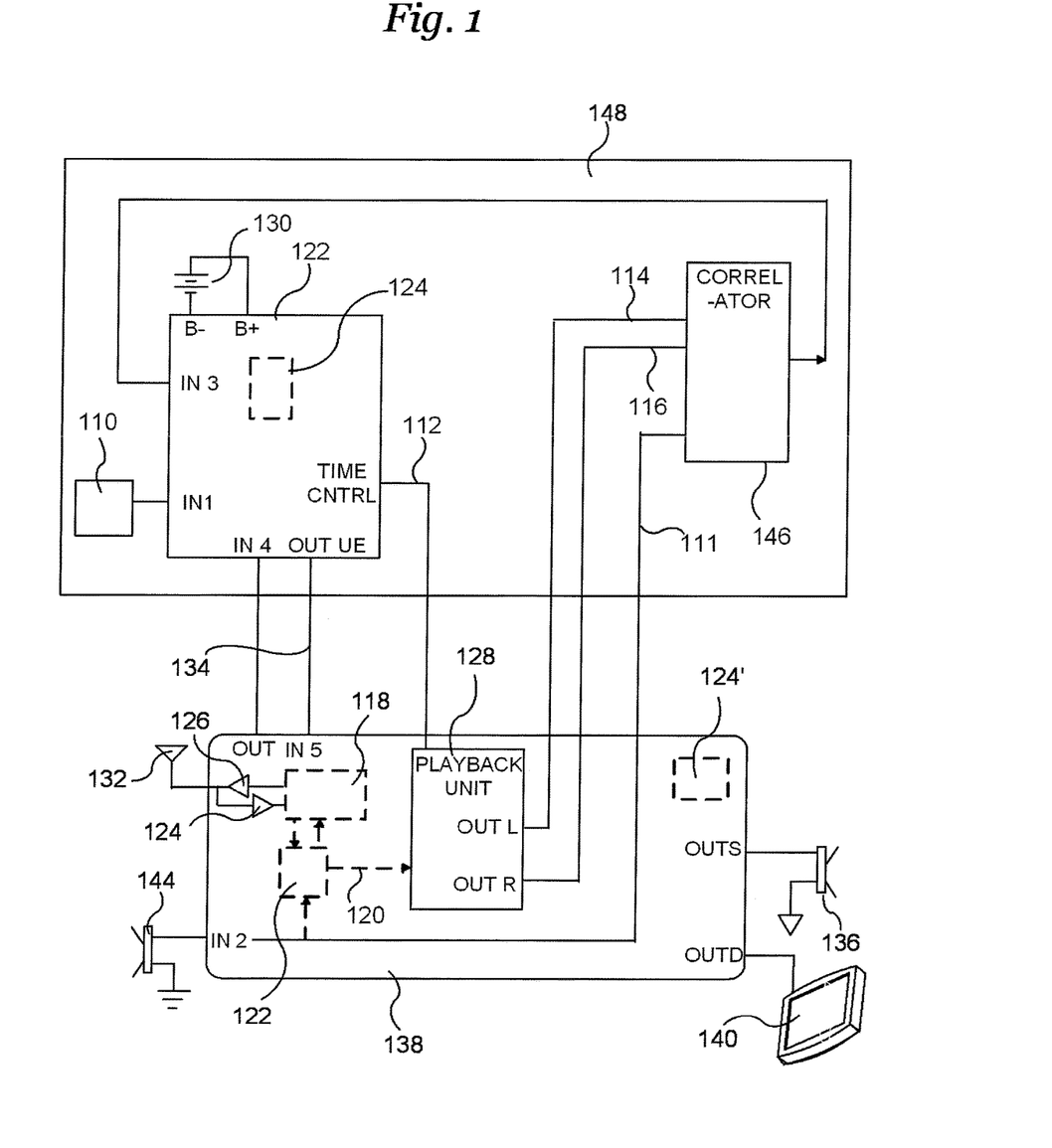
FIG. 1 is a schematic block diagram of the device in accordance with the principles of the present invention.

Referring to FIG. 1, a schematic block diagram of an adjunct device, 148, for altering services in response to operation proximal to a vehicular operator station, is shown. The adjunct device, 148, is in communication with portable electronic device, 138, via optionally bi-directional communication channel, 112.

Processor, 122, via processor output, OUT UE, signal over channel, 134, commands portable electronic device, 138, to upload at least a snippet indicative of acoustic signal from microphone, 144, to a network, not shown for clarity, via 10 antenna, 132, whereby the signal is correlated with a broad selection of known content, e.g. songs.

Alternate embodiments are based on characteristics of the content, and/or correlation optionally occurs based on encoded artist/song name, or otherwise High Definition Radio signal and deduces content snippet Characteristics may include: artist/title information, discretization boundaries, acoustic based timestamps, or other track information including video The network downloads content with some of this characteristic, at least a snippet, e.g., wave file, and/or object designed to re-create the content, at least a partial download occurs via 1/0 antenna, 132, which is connected to Low Noise Amplifier, 124, which makes the signal available to up/down-converter, 118, which makes the signal available to baseband processor, 122, which stores at least part of the down-converted object in playback unit, 128. Processor, 122, commands playback unit to use various delays, various starting points in the said, at least part of content, snippet, until the correlator, 146, maximizes its output indicating essentially time alignment between the content being played back and the content being sensed by acoustic transducer, 144, and presented to the correlator, 146. Processor, 122, commands the correlator to, adjust this in time, at certain intervals to remain tracking the content, and uses error signal feedback between the content played back and the incoming acoustic signal, to attempt lockup, and remain locked up at various intervals of time delay. Time delays used by processor, 122, which serve to maximize correlator output signals correspond to acoustic delays between the received signal time via the microphone and the track playing in playback unit are used to create this error signal. Although the correlation is maximized per a given track, or combination thereof, such as both the Left plus Right, (L+R) the playback phase is further adjusted to ensure that all quasi-correlation points are determined, I.e., the correlation peak representative of the best time alignment between the L+R, incoming via the microphone and the received electronic Left channel, and then finds the best alignment between the acoustically incoming L+R and the received and demodulated electronic Right Channel. This can happen in the opposite case as well where the correlation is maximized between the L+R and the Right and then goes on to find the maximum correlation with the Left channel. The difference, and polarity in time delay between the plurality of channels, which can be higher than two, i.e. rear channels too, represents the relative time taken for the signal to arrive at the microphone from the respective transducers, e.g. speakers, permits the processor to deduce which channel, e.g. side, or back/front, is closer to the microphone. The delay multiplied by the speed of sound represents the relative distance to the speakers. The polarity of this delay, (please see FIG. 2d) represents an indication of which vehicle speaker is closer. If the delayed left content snippet best matches the right stream acoustic snippet, the left speaker is closer. If the delayed right content snippet best matches the left content snippet, the right speaker is closer. By taking the highest correlation points, the portable electronic device deduces proximal to the operator's station and consequently, it further adjusts services, e.g., shuts off, inhibits texts, network informs, forces use of voice recognition technology, forces voice to text, with optional delay accordingly.

An alternate embodiment makes this content-to-download decision at least partly onboard portable electronic device, 138, from onboard memory, containing wave files, content objects, or stream generation objects.

As the decision for altering portable electronic services need only be done on a low duty cycle basis, adjunct device 148, is equipped with an optional triggering element, 110. Optional triggering element can be any of the previously discussed mechanisms (ignition wire magnetic field time patterns, acceleration, velocity, difference in time divided by difference in position, cell tower ID change, ODS II signal, Bluetooth signal, DSRC signal, etc.)

Adjunct device of FIG. 1 additionally has battery, 130, memory 124, and correlator, 146. Suitably equipped portable electronic device has playback unit, 128, optional memory, 124', audio transducer, 136, display, 140, and amplifier, 126.

In another embodiment, at least part of, a database, is exploited to offer at least a snippet of signal representative of channel output against which the correlation of incoming signal is preformed. In some embodiments this snippet is at least partially on portable memory media.

In some embodiments this information is downloaded based on the song title/artist information contained on the stream information. In some embodiments correlation is performed on this information track itself, or derived from time information on the track.

Figure 2:
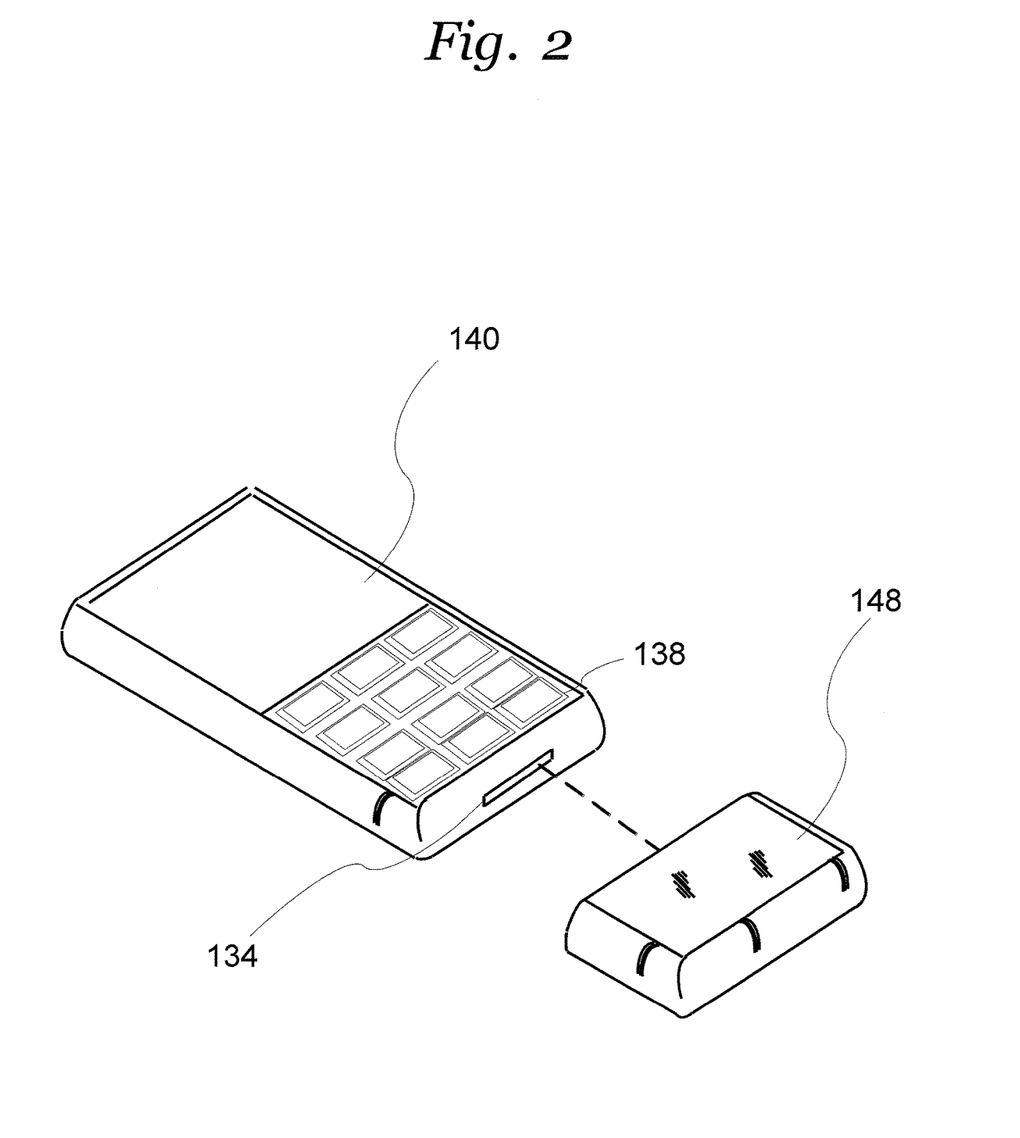
FIG. 2 is a perspective drawing, showing the adjunct device in association with portable electronic device, an alternate to that of FIG. 1.

FIG. 2, shows the adjunct portable electronic device, 148, operable to be attached to portable electronic device, 138, with display, 140, and optional connector, 134.

Figure 2B:
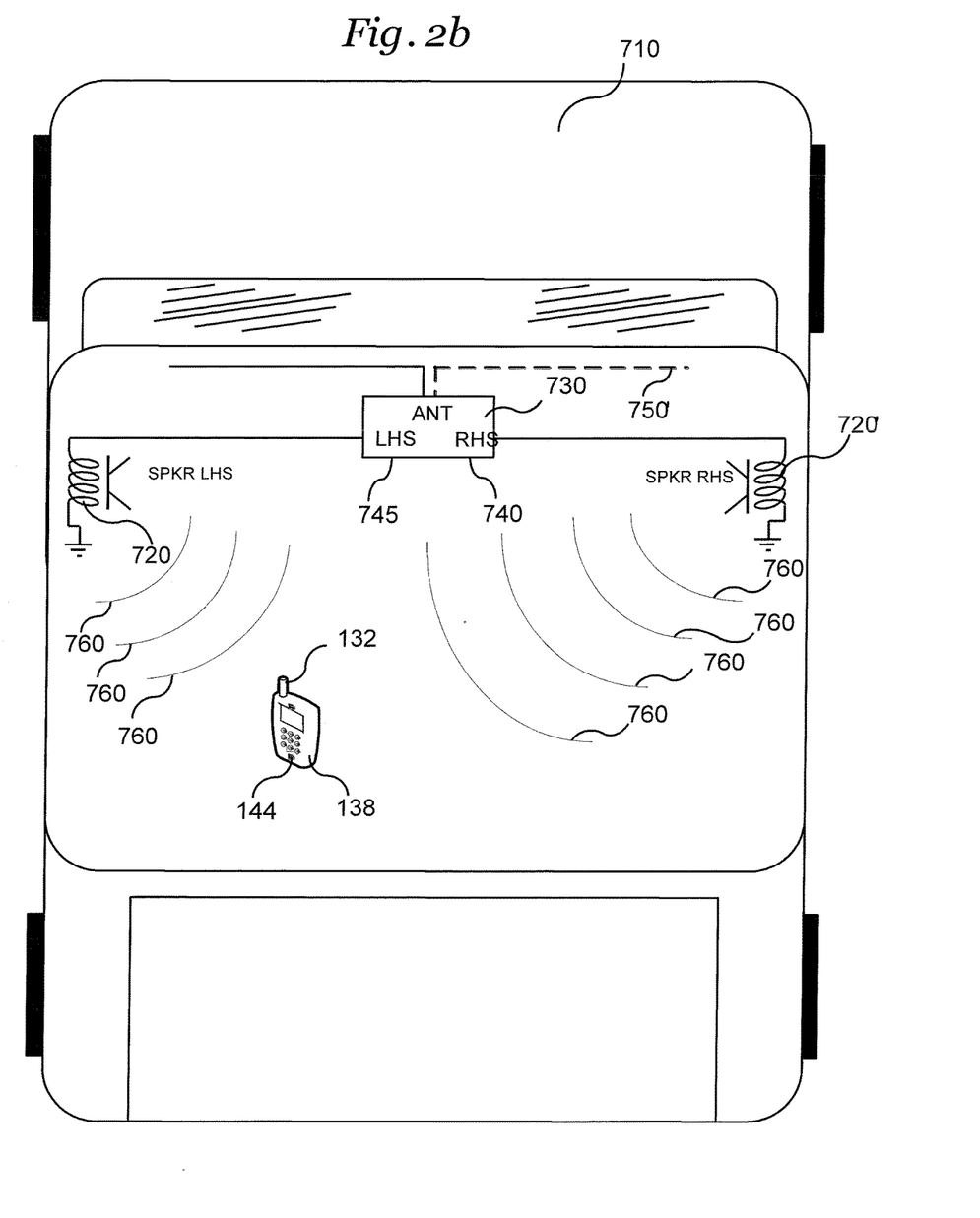
FIG. 2b is a schematic block diagram showing an exemplary vehicle location of the portable electronic device for a stereo arrangement.

Referring to FIG. 2b, vehicle 710, contains a broadcast radio, 730, with antenna, 750', with channels 745, and 740, connected to spatially separated speakers, 720, and 720' respectively. Emitting acoustic signal, 760, to portable electronic device, 138, via microphone.

Figure 2C:
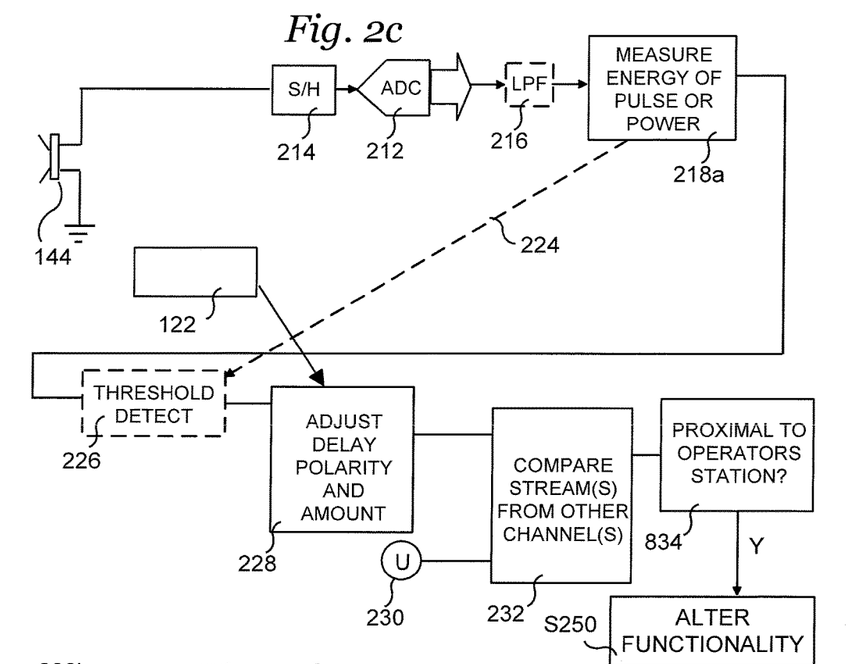
FIG. 2c is a flow chart showing an example signal chain

FIG. 2c shows an exemplary signal processing chain for acquisition of acoustic signal via microphone, 144, connected to sample and hold, 214, ADC, 212, optional Low Pass Filter, 216, module to measure signal magnitude, 218a, optional threshold detector, 226. Module 228 normalizes the signal intensity to permit correlation in module, 232. Module 228 also inserts various delays under control from processor, 122 (memory and battery not shown for clarity). Upon detecting a high correlation between the incoming demodulated RF signal, 230 (shown as U), the compare module deduces the distance from the broadcast radio (FIG. 3), or other channel, FIG. 1. It is to be noted that many technologies have delays, such as Bluetooth, or xm. The example broadcast radio, is stereo FM, wherein the obligation on the radio manufacturer to maintain acoustic phase relationships between channels, makes it simpler to eliminate any channel delay that might otherwise be in the design.

Most FM radios consequently, have very little delay in the conversion from RF to acoustic, for either channel, and are the preferred but not exclusive broadcast radio technology.

Figure 2D:
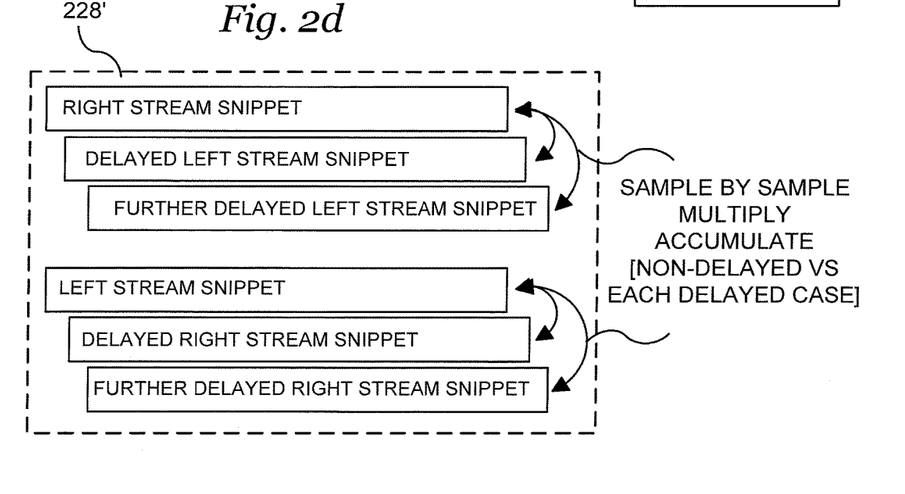
FIG. 2d shows multiple channel stream snippets for correlation attempts with the other channel in a stereo arrangement.

FIG. 2d, shows the comparison between channels of the device of FIG. 1. The right stream snippet is compared to the left stream snippet, under various delays. It is to be noted that a deduction of proximity to the driver's side channel relative to the front passenger side channel, is commonly enough to deduce portable electronic device use by the driver and inhibit the operation. It is not necessary to know the location in three dimensions, or even two dimensions; a comparative estimate of driver's side is sufficient. Some examples force the driver's side rear passenger to change seat locations to place calls.

By comparing the sensed acoustic signal with the delayed played back channels as shown in FIG. 2d, the device will have the correlation case with the first received signal delayed yielding the greater results. A threshold detector, or comparison of the two results will offer an indication of which vehicle side is closer to the portable electronic device. For cases of operation, or attempted operation closer to the vehicle operator's position, the unit will alter services, e.g., inhibit texting, phone calls, etc.

It is to be noted that the unit optionally exploits the right for left and vice versa anti-spoofing frequency response (from Bradley US application, BLY104), and headphone lockout after 'driving trigger', 110 has triggered, are employed, i.e., the unit must be used in non-hands free fashion once vehicular motion is detected.

In some embodiments the portable electronic device will be inhibited if the broadcast radio is not detected.

It is noted that fore/aft determinations (required to differentiate the rear left passenger seat from that of the operator—for left hand drive vehicles) are restricted to optional four-channel installations for the device of FIG. 1.

Figure 3:
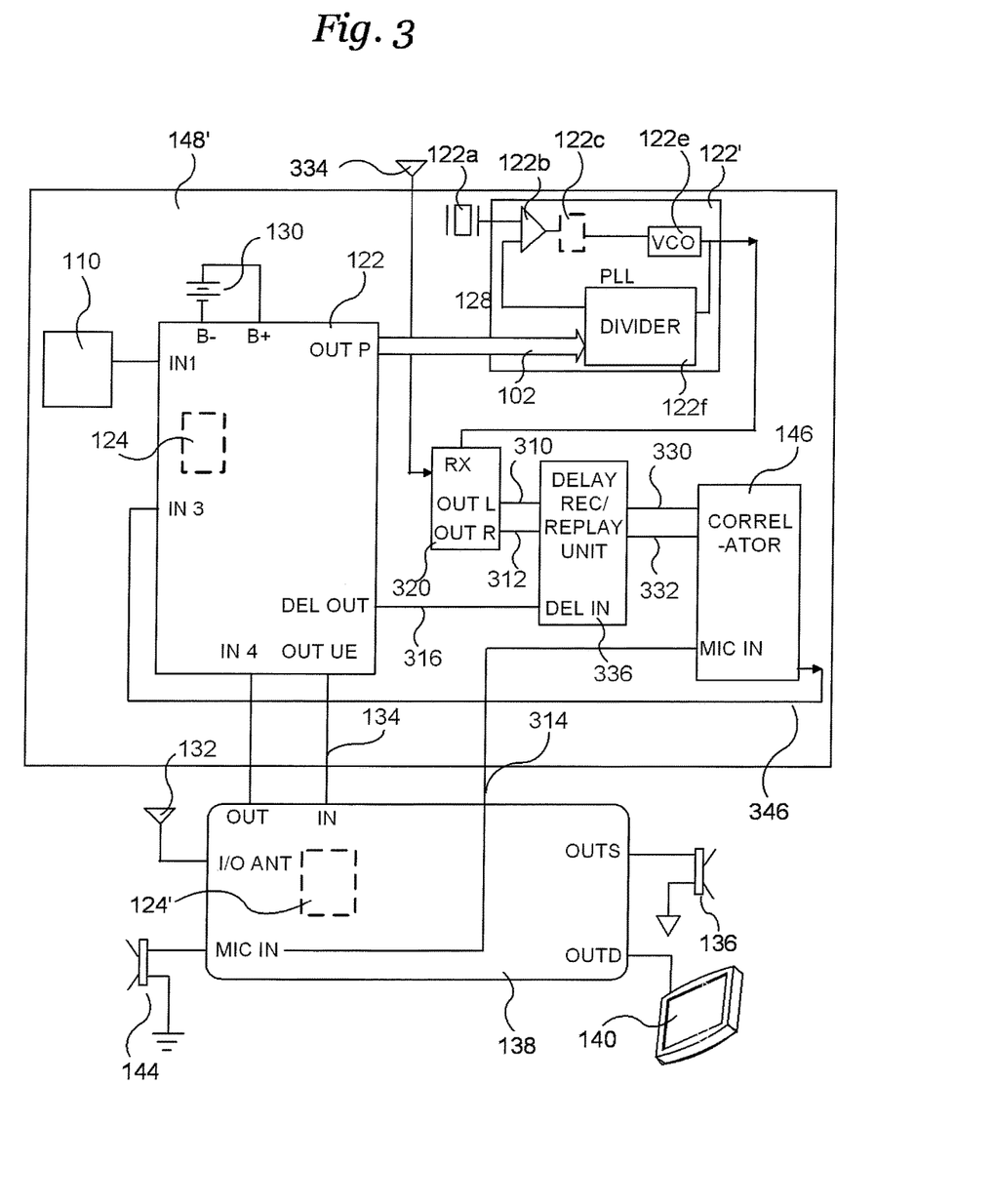
FIG. 3 is a schematic block diagram of an alternate arrangement to the device of FIG. 1.

FIG. 3 has adjunct device, 148' alternate to that of FIG. 1, attached to portable electronic device 138.

Adjunct device 148' has processor 122, with memory, 124, battery, 130, and triggering device, 110, signal when the apparatus senses it is in a vehicle no longer at rest. Additionally frequency synthesizer 122' generates frequencies appropriate for receiver 320 use, and has crystal, 122a, phase detector, 122b, optional low pass filter, 122c, Voltage Controller Oscillator, 122e, and PLL divider, 122f under control of data bus 102, from processor 122.

Processor 122 finds frequency of broadcast signal, via mechanism described in FIG. 4, to be explained later in the disclosure employing mechanisms known in the art.

Portable electronic device, 138, is supplied with the acoustic environment via microphone, 144, at input, IN, and signal, 314. This signal is supplied to correlator, 146, and correlation attempts are made with incoming multi-channel signals, 310, and 312, representative of the left and right channel signals respectively, and received by receiver, 320. Processor, 122, via output signal 316, adjusts a variable delay/replay unit, to alternately variably delay the electronic replica channels from receiver, 320.

In this embodiment adjunct apparatus, 148, input IN 3, is the signal returned from the correlation, function.

Delay/playback unit, 336, output channels, 330, and 332 from portable electronic device 138 to adjunct apparatus, 148' and are input to correlator unit 146 and each demodulated, variously delayed, incoming RF channel is correlated against the incoming acoustic channel. It is understood that the playback unit is optionally replaced by the digital time delay mechanism of either FIG. 5, or the analog time delay mechanism of FIG. 9.

Processor 122 commands the Phase Locked Loop, 122', to cycle through the various channels, until finding the one being listened to, as will be explained in FIG. 4. Remaining on this channel, the adjunct device adjusts the delay of the demodulated incoming RF signal for one channel, 310 and then the other channel, 312. Strong correlations with each of these RF channels indicated by peaks permit the processor, 122, to deduce the distances by multiplication of the delay by the speed of sound. The resultant distance indicates the distance to the portable electronic device from each of the speakers. Four speaker systems offer four different distances. Two speaker systems offer two distances that exceed realistic speaker to front seat distances for rear passengers, and are shorter than realistic speaker to rear seat distances for front seat locations. In this way the seat that the user occupies is known. For locations proximal to the operator's station, processor 122 commands the inhibiting of at least some pot able electronic services. It is understood U1at U1e poriable electronic device is a cell phone, a pager, a smart phone, a phone watch, phone glasses in alternate embodiments.

It is understood that although the time delay between the broadcast station to the radio receiver and the time delay between the broadcast station and the portable electronic device differ, the difference in the delay is negligible, compared to the acoustic delay, and is assumed to be simultaneous for the present discussion. Some embodiments delay the reset of services, e.g., for 20 seconds, to prevent the use of the portable electronic device whilst stopped in traffic.

Figure 3B:
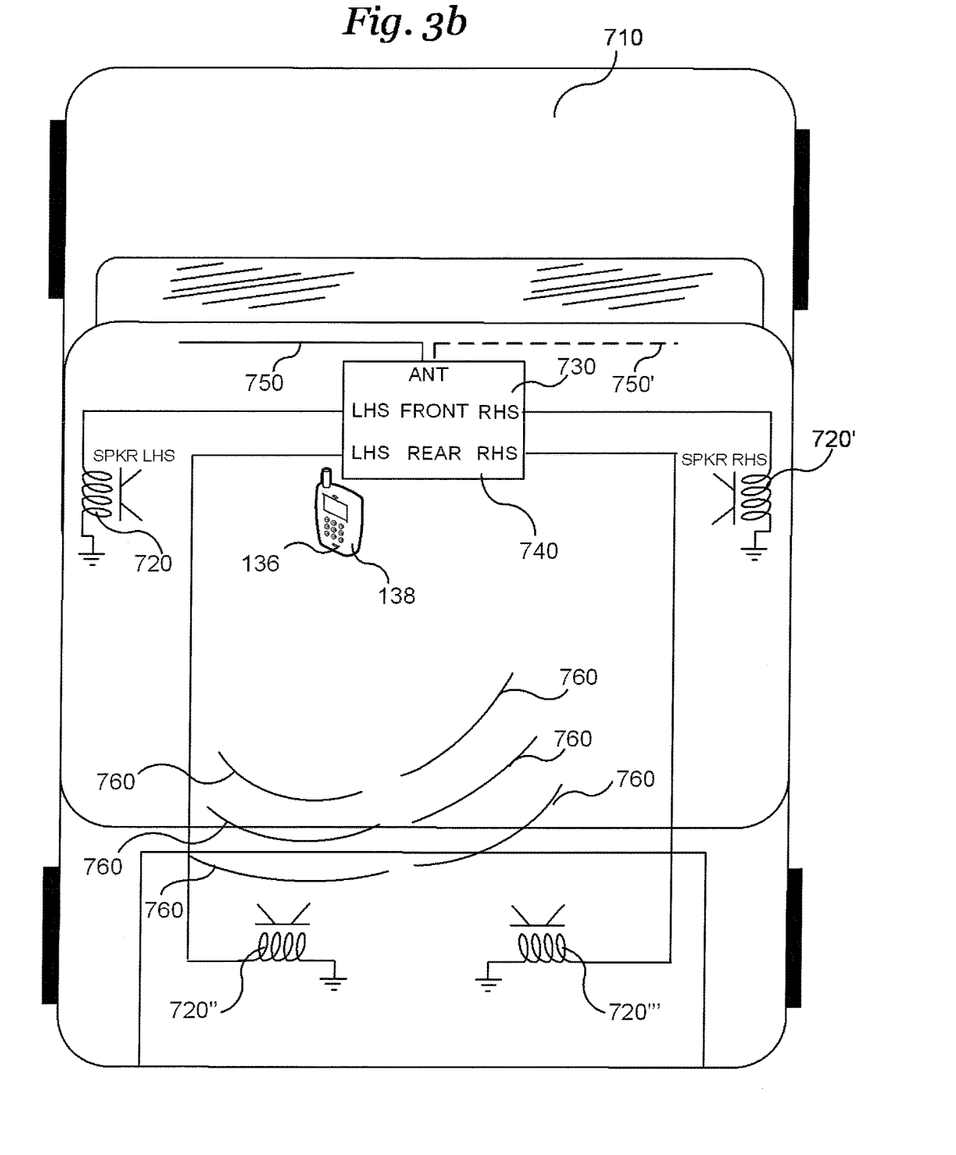
FIG. 3b is a schematic block diagram showing the adjunct device in an exemplary vehicle location for a quadraphonic arrangement

FIG. 3b illustrates an embodiment wherein the four channels are emitted by four speakers permitting the incoming acoustic signal correlation to be performed against each channel. Determination of the relative delays from each of the four speakers multiplied offers a rough estimate of where the portable electronic device is located. For locations that are proximal to vehicle operator station the portable electronic device operation is altered, inhibited, modified, etc.

Figure 4:
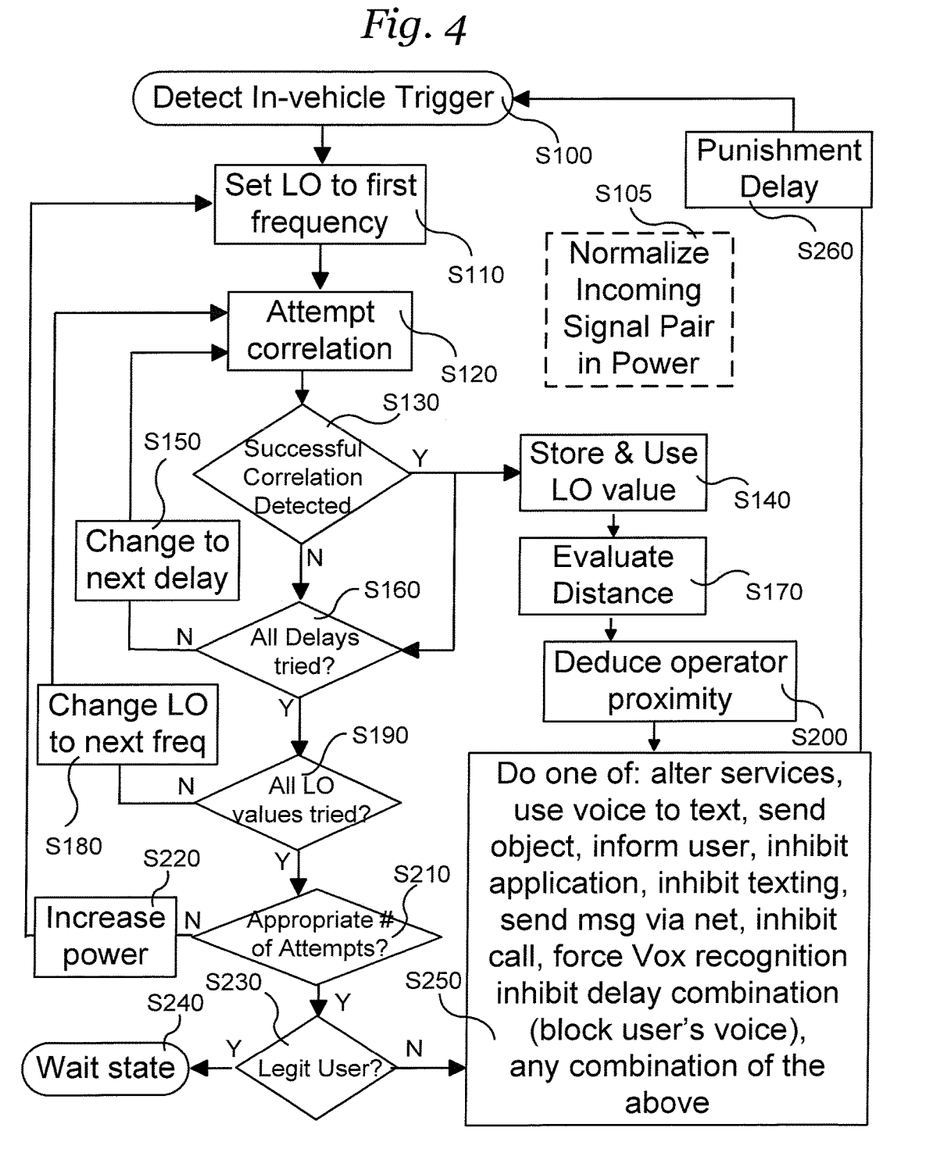
FIG. 4 is a flow chart supplementing the operation illustrated in FIG. 3.

FIG. 4 is a schematic flow chart showing exemplary processing steps used by the embodiment of FIGS. 1 and 3 to arrive at the correct frequency to use for the correlation for cases of music snippet download and incoming demodulated multi-channel RF. The thread is initiated at step S100, at the instant of in-vehicle trigger. Upon detecting trigger at step S100, processor, 122, initiates, and executes the thread Initiation beginning at step S110, includes setting the first frequency, e.g., 88.1 MHz in the case of broadcast FM. Not shown for clarity, the processor also instantiates a low voltage signal replica to be initiated, i.e., an electronic signal similar to a low volume FM reception, except that the signal remains in the electronic domain, and is input to the correlator. Subsequently correlator, 2146, attempts to correlate, at step S120, the electronic version of the incoming live acoustic signal, from the microphone with the replicas, 2210, and 2212, being generated from receiver, 2220. At step S130, the processor, 122, detects a correlation by detecting a peak greater than a specific threshold value, previously set, or optionally determined from signal envelope power assessment, not shown for clarity. At step S150, processor, 122 adjusts the delay of the rec./replay unit, 2236 until all reasonable delays have been ascertained to have been attempted at step S160. After each attempted sequence of correlations of various delays, the frequency is adjusted by Phase-locked Loop, 122', via connection 122 by processor, 122, at step S180.

Upon completion of a correlation sequence at various delays, at various frequencies, the fact that all frequencies have been tried is ascertained by the processor, 122, at step S190. Due to possible noise in the environment, this entire sequence is repeated until it has been attempted more than a given number of times, for example three times, at step S210. Processor, 122, subsequently, sequentially increases the power by a small amount and repeats the sequence. This increase in power is affected at step S220. The entire sequence is then repeated a certain number of times, once again, ending each attempt at step S210 Power is increased several times, after which it is reset to a low power value, and the processor can optionally inform the user to turn on the radio via a simulated voice, or visual message. Depending on configuration, the unit can at this time repeat the entire sequence, or directly execute step S250, whereby the communication is adjusted, via altered services, i.e., cell phone shut off, text shut off, forced use of text to voice, forced use of Siri, forced use of voice to text, inhibited texting, inhibited internet, inhibited applications such as facebook, twitter, etc, an object is sent to the network, the users voice is inhibited, etc.

Preceding this step 8230 assesses whether the user is a legitimate user of the portable electronic device, such as fireman, ambulance attendant, anyone using an emergency number, a passenger on mass transit, such as train, plane, bus, ship, as outlined in patent application U861/262,646 19 Nov. 2009.

Alternate embodiments compare signal strength of the envelopes of incoming signal from the microphone and the simulated received signal via the receiver, at step 8105. As the correlation peaks are detected to be exceeding a specific threshold, the value of the delay at which this occurs is stored, at step 8140. The delay, derived from the time delay of these peaks that exceed a given threshold, including any delay of the incoming reception chain, is converted to a distance via the equation d=vt, where d is distance, v is velocity, in this case it is the speed of sound, approximately 331 m/s, and t is time. This conversion is performed at step S170. It is understood that the speed of sound changes slightly with temperature and that this can optionally be sensed and optionally incorporated into the conversion. Distances calculated are used to deduce user location with respect to the vehicle at step 8200. Cases for which the user is proximal to the vehicle operator's station, or fails the correlation-testing representative of a vehicle passenger, are dealt with at step 8250.

It is understood that although, signal can be input from a single channel device that the correlation function is continued at greater delays and subsequent correlation peaks exceeding a fixed/adjustable threshold are determined at processing step, 8170 of FIG. 21b, or at correlator 146, in FIGS. 1, and 3. It is understood that these correlations when taken with either of the supplied Left, Right, (or left rear, left front, right rear, right front), use the arrangement configuration to make the determination of which channel most closely correlates with that delay, with the acoustically received channel, e.g., the Left channel is known internally and will correlate most heavily with the incoming acoustic channel for a given interval of time, whilst the right channel is known internally, (and supplied by a different internal path), and will correlate most heavily with the acoustically received composite L+R monophonic channel generally at a different point in time. This unless the distance to the left and right sides are the same, which is can optionally be declared by processor, 122, to be proximal to the vehicle operator's station.

It is understood that software-processing steps can be used on a partially general-purpose processor. The general purpose processor becomes a specific device with the inclusion of this specific purpose software, firmware. In such cases, this is considered to be hardware executing in a specific way and is considered to read as this is written, provided the same functionality is executed, or performed adjacently.

Figure 5:
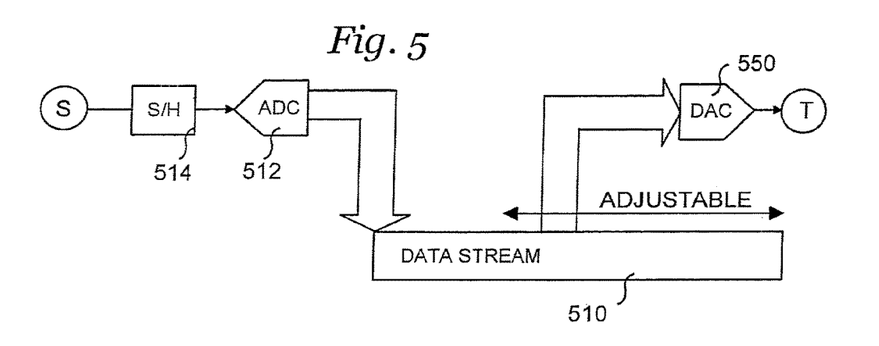
FIG. 5 is a schematic block diagram illustrating a section of the processing chain for digital delays
Figure 6:
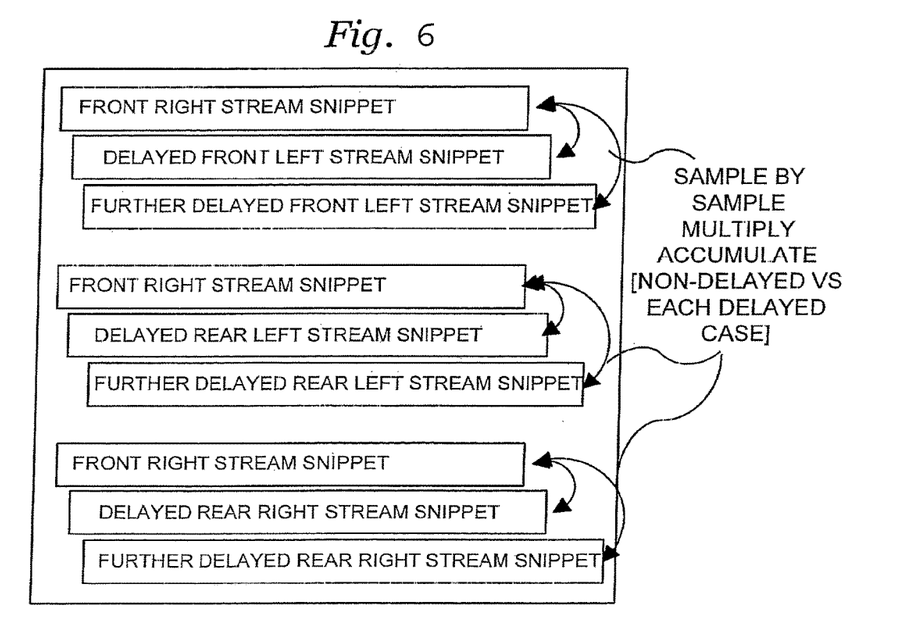
FIG. 6 shows multiple stream snippets for correlation attempts for a four-channel installation.

FIG. 5

Figure 9:
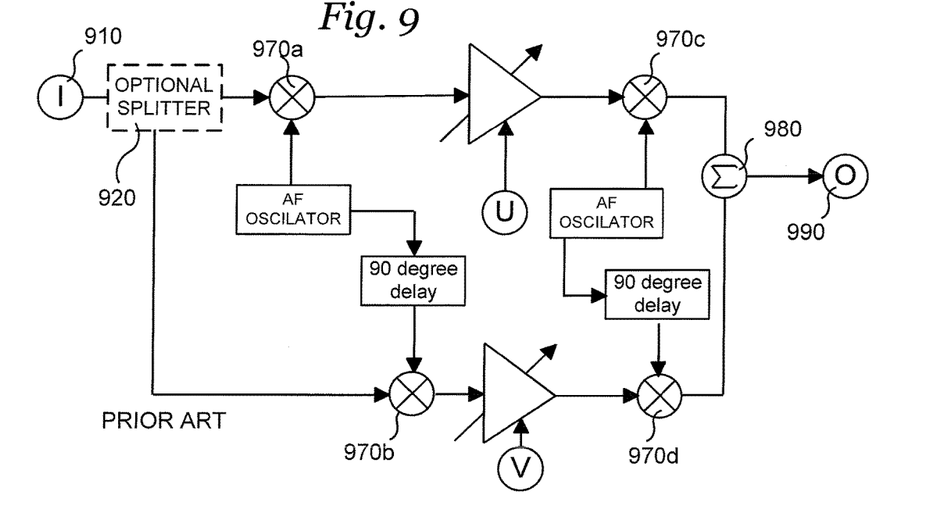
FIG. 9 illustrates the optional (electronic) audio frequency signal processing chain for inserting an analog delay.
Figure 9B:
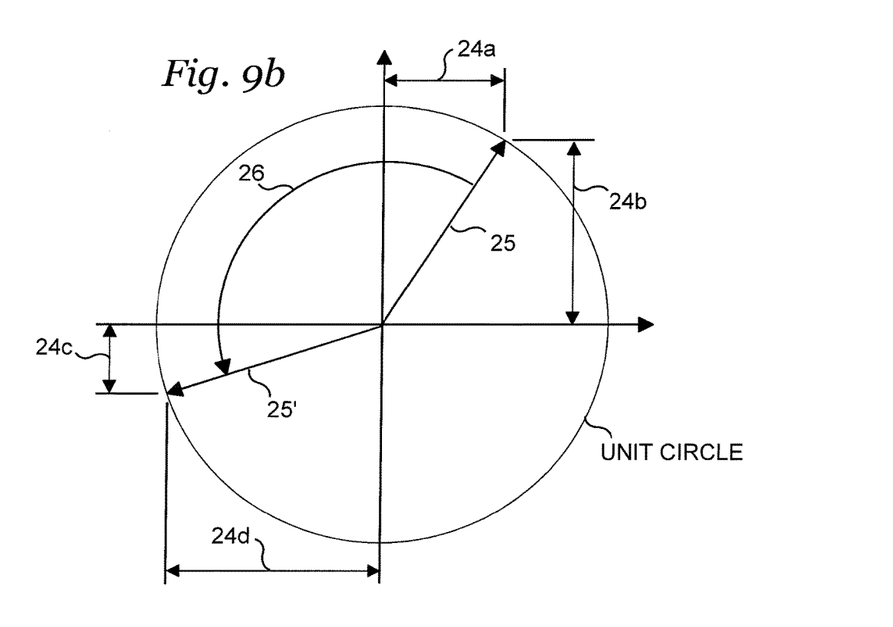
FIG. 9b illustrates various angles of the analog signal, shown in a constellation diagram.

This time delay is one mechanism for implementing a time delay. An arrangement alternate to that of FIG. 5, is shown in FIGS. 9 and 9b.

It is understood that many different techniques are available for use and are considered to be part of this disclosure.

Delays per channel are multiplied by the speed of sound (~331 m/s), and are thereby converted to an estimation of distance from the respective speaker.

This distance information is used by the processor to determine use, or attempted use by the operator of a motor vehicle. The processor further alters services (e.g., phone use, texting use, application use, are shutdown) pertaining to this intended use, or use. Outputs in step 8250 are implemented via exploitation of the portable electronic devices control channel, via a communication channel driven from the embodiment of FIGS. 1, and 3 a dedicated short range communications (DSRC) channel to the portable electronic device, or alternately modifies the vehicle operation profile, (none are shown) This communications is optionally performed via a docking station provided in the vehicle, which switches the portable electronic unit, or provides a data connection, optionally wirelessly, or optionally acoustically.

FIGS. 9a and 9b, part of the prior art, shows schematic block diagram that effects a phase shift. Sampled signal enters the optional processing chain at input, I. This signal is optionally split at splitter 920. Outputs from splitter 920 are mixed with audio frequency, (AF), oscillator, in phase and in quadrature, and each leg has a gain setting applied, by processor, 122, of FIGS. 1 and 3. The restriction of the various gains, U, and V, as supplied by processor, 122, of FIGS. 1 and 3, is that the U, and V values are representative of the location on the unit circle that the desired phase shift represents. Referring to FIG. 9b, in this example incoming signal, represented by vector 25, with in-phase component 9a, and quadrature component, 9b, is shifted by time delay, 26, to location vector 25', with in-phase component 9d, and its corresponding quadrature component, 9c.

In reference to FIG. 5, acoustic signal incoming from the left, is sampled by sample and hold (S/H), 514, and provided to ADC, 512. Data from the ADC is provided to streaming memory, 510. Streaming memory, 510, in turn provides this information, in digital form, to DAC 550, with various delays, under the control of processor, 122, of FIGS. 1 and 3.

Figure 7:
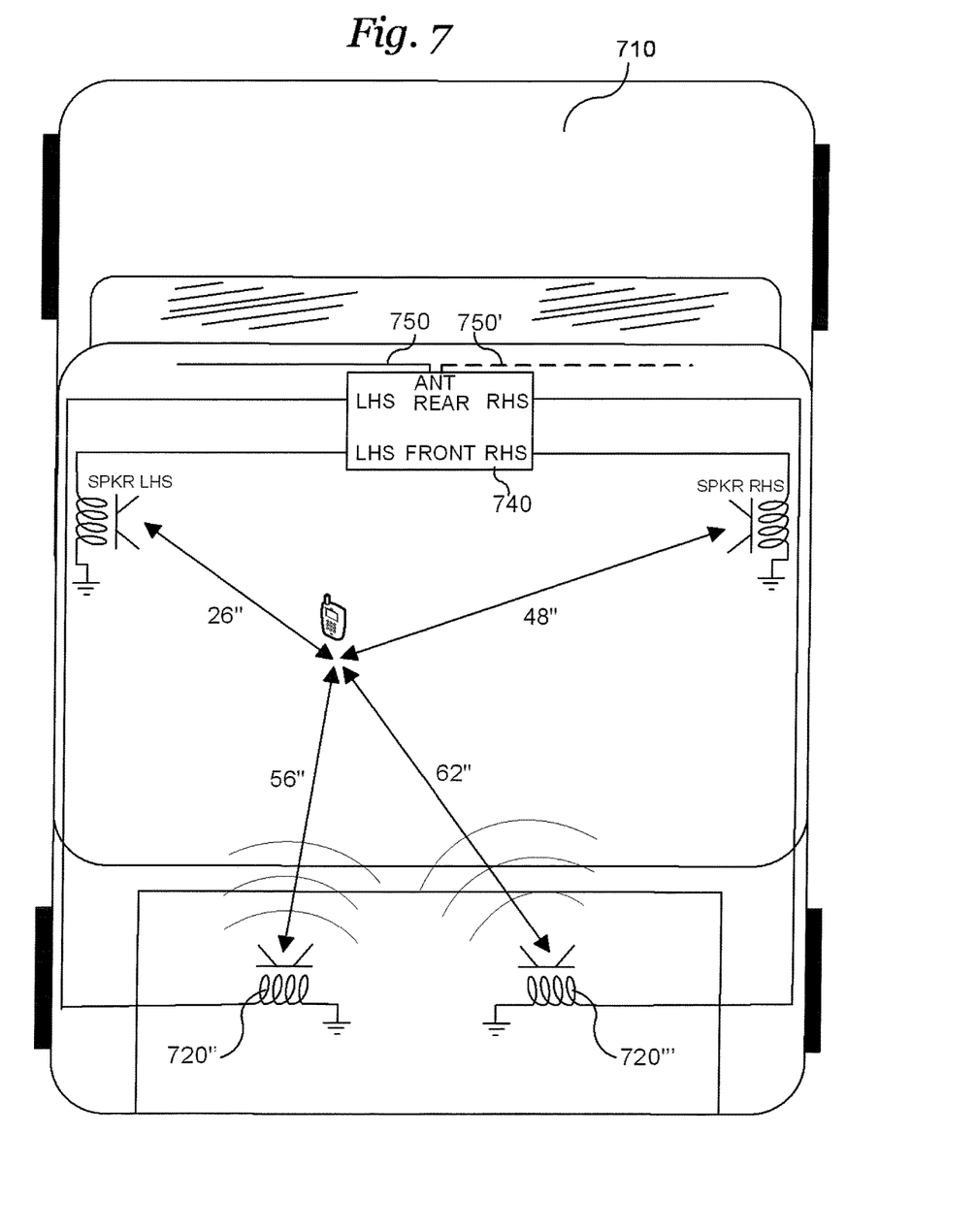
FIG. 7 is a schematic block diagram illustrating an example vehicular location
Figure 8:
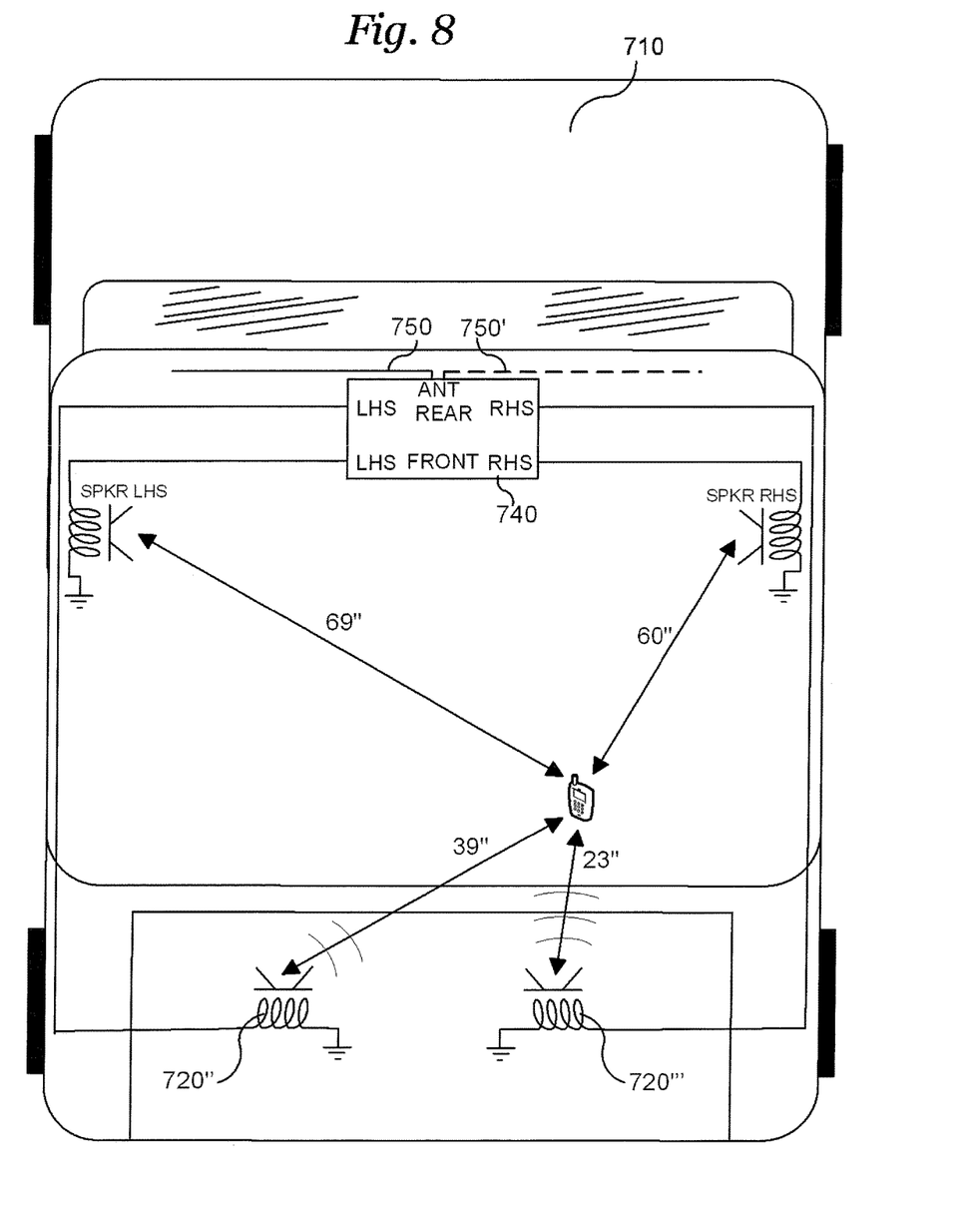
FIG. 8 is a schematic block diagram illustrating a different example vehicular location

It is understood that some conversation/commands are appropriate, such as change channel, or alter navigation system destination that are permitted if a suitable correlation is made indicating speech from the operator's station. It is understood that the three correlation functions that take place associated with this front right speaker are then repeated with signal from the other four locations, and that signal originating from the operator's station is treated differently, thereby altering the services that the portable electronic device or vehicle are allowed to perform/continue to perform. The signal originating from a speaker and docked portable electronic device, 138, is shown in FIG. 7. FIG. 7, an alternate to previous arrangements, including those of FIGS. 1, and 2, is a four speaker equipped version. It is understood that FIGS. 1, and 2 are four speaker versions including the rear speakers in some arrangements. It is understood that in some arrangements analog delay lines are used for signal retardation.

In yet other embodiments communications from the vehicle to portable electronic device link is exploited for altering services.

It is understood that this can be implemented in different ways without deviation from the present disclosure.

The invention claimed is:

1. Apparatus cooperating with an acoustic transducer operable to provide an acoustic signal in response to one or more sources of sound that are issued at a distance from a portable electronic device and are derived from a radio broadcast signal, in order to modify operation of the portable electronic device, the apparatus comprising:
   a radio receiver having a demodulator for producing a demodulated output that corresponds to, and has a temporal gap relative to, the one or more sources of sound,
   a delay element for producing from said demodulated output a delayed signal that is delayed by an adjustable amount,
   a correlation element having an acoustic transducer, the correlation element being operable to provide for providing a correlation output signifying an amount of correlation with the acoustic transducer,
   a processor coupled to said delay element and said correlation element, and
   a switching element coupled to said processor for altering services at said portable electronic device, said correlation element being operable to correlate said acoustic signal with information obtained from said delayed signal, said processor being operable to successively adjust delay by said delay element by an amount that differs in successive time intervals and to detect from said correlation element during one or more of the successive time intervals one or more peak correlations, delay by said delay element at a magnitude that produces the one or more peak correlations representing travel time from the one or more sources of sound to the acoustic transducer, and being used to deduce portable electronic device use relative to the one or more sources of sound and to operate said switching element in response.

2. The apparatus of claim 1, wherein the radio receiver is multi-channel, said demodulator being adapted to provide one or more channels using said demodulated output, said processor being operable to adjust delay by said delay element and detect from said correlation element for one or more of said multiple channels one or more peak correlations.

3. The apparatus of claim 1, wherein the radio receiver is FM.

4. The apparatus of claim 1, wherein said demodulator is adapted to provide four channels, the processor being operable to assess the four channels, in order to discern rear vehicle seating locations, and operate said switching element to permit unfettered operation of said portable electronic device.

5. The apparatus of claim 1, wherein the delay element comprises a phase shifter.

6. The apparatus of claim 1, wherein the processor uses delay by said delay element that produces the one or more peak correlations to deduce distance of the portable electronic device from the one or more sources of sound.

7. A portable electronic device comprising:
   a receiver;

a demodulator coupled to said receiver for providing a demodulated signal signifying content;

a delay element coupled to said demodulator for providing from said demodulated signal a delay signal;

a processor;

an acoustic to electronic transducer operable to produce electronically an acoustic signal signifying sounds from one or more sources of sound;

a correlator' for providing a correlation output representing an amount of correlation between said acoustic signal and said delay signal; and a switching element for altering services, said processor being operable to change delay in said delay element, said correlator being operable to discern strongest correlation, said correlator being operable to correlate content of said acoustic signal and content of said delay signal, the processor being operable to successively adjust delay by said delay element by an amount that differs in successive time intervals and to detect from said correlator during one or more of the successive time intervals one or more peak correlations, delay by said delay element at a magnitude that produces the one or more peak correlations representing travel time from the one or more sources of sound to the acoustic transducer.

8. The device of claim 7, wherein the processor is operable to download through said receiver channelized content corresponding to content of said acoustic signal, said processor being operable to programmatically timeshift the channelized content derived from said receiver to be substantially concurrent with that acoustically sensed by said transducer in order to assess, relative to said acoustic signal, delays in said channelized content and to alter portable electronic functionality based on an assessment of location of the acoustic to electronic transducer.

9. The arrangement of claim 7, wherein the processor is operable to assess four channels and said correlation output represents correlation among the four channels of the delay signal with respect to each incoming acoustic channel content in said acoustic signal to make an assessment of location by post processing.

10. An arrangement to alter services of a portable electronic device located near a primary receiver that is operable to produce at least one channel of sound, the arrangement comprising:

an auxiliary receiver for receiving a channel replica;

an acoustic sensor for sensing an acoustic content stream; and a correlator coupled to said auxiliary receiver and said sensor for time shifting and correlating the channel replica with respect to the acoustic content stream, wherein said channel replica is sensed via a radio frequency (RF) signal path, the correlator being operable to produce a correlation signal and alter services to the portable electronic device in response to the correlation signal, the correlator being operable to successively time shift by an amount that differs in successive time intervals and to detect from said correlator during one or more of the successive time intervals one or more peak correlations, time shifting at a magnitude that produces the one or more peak correlations representing acoustic travel time from the primary receiver to the acoustic sensor.

11. An arrangement to alter services of a portable electronic device comprised of:

a processor having inputs adapted to receive acoustic content snippets from one or more nearby sources of environmental sounds and adapted to receive downloaded content snippets, the downloaded content snippets being obtained over a network from a location separate from said processor and separate from the nearby environmental sounds, said processor being operable to delay the downloaded content snippets and correlate them with the acoustic content snippets, wherein the delay is detected and used to make a determination of relative distance to an originating source within the nearby environmental sound, said distance being used to make a deduction of use of said portable electronic device proximal to a predetermined location, and said deduction being used by said processor to alter services of said portable electronic device.

12. A method to deduce the particular one of a plurality of entertainment channels being used to produce sounds in a predetermined environment, the method comprising the steps of:

selecting a first one of the plurality of entertainment channels;

receiving separately from the selected first one of the plurality of entertainment channel, a first channel replica;

delaying the first channel replica;

determining the amount of correlation of the delayed first channel replica with an acoustically sensed content stream contained in sounds in the predetermined environment; and selecting a second one of the plurality of entertainment channels if the amount of correlation of the delayed first channel with the acoustically sensed content stream is below a predetermined magnitude.

13. A method of portable electronic service alteration comprising the steps of:

detecting acoustic content based on sounds in an environment originating from one or more acoustic sources, identifying the acoustic content with a corresponding portion of predetermined channelized content at a processing location separate from the one or more acoustic sources, downloading the corresponding portion of the channelized content over a network from the processing location, correlating the corresponding portion of the channelized content with the acoustic content, the correlating being performed to assess relative delays between the acoustic content and at least one channel of the corresponding portion of the channelized content, noting relative delays that cause a peak correlation with the acoustic content, allotting a distance to the relative delays, using the allotted distance to ascertain an aspect of location relative to the one or more acoustic sources, and altering portable electronic device services based on this ascertainment.

14. A method for altering service of a portable electronic device, the method employing a receiver that produces a demodulated signal, the method comprising the steps of:

detecting acoustic content based on sounds in an environment originating from one or more acoustic sources;

delaying the demodulated signal by successively adjusting delay by an amount that differs over time in successive time intervals to produce a temporally adjusted delay signal; and correlating the temporally adjusted delay signal and the acoustic content during one or more of the successive time intervals to detect one or more peak correlations that are used to deduce portable electronic device use relative to the one or more acoustic sources and to alter service at the portable electronic device, delay at a magnitude that produces the one or more peak correlations representing travel time from the one or more acoustic sources to the portable electronic device.

15. The method of claim 14, wherein, the step of altering services is performed to restrict a use that is prospective, imminent or ongoing.

16. The method of claim 14, wherein the step of deducing use of the portable electronic device proximal to the operator's station is primarily based on distance to a source of sound in the environment.

17. The method of claim 14, wherein the step of deducing use of the portable electronic device proximal to the operator's station is based primarily on relative distance to two sources of sound in the environment on the left and right.

18. The method of claim 14, wherein the step of altering service forces use of one of: voice to text, or text to voice, with inhibition of other services.

* * * * *